United States Patent
Hemstock

(10) Patent No.: US 8,945,256 B2
(45) Date of Patent: Feb. 3, 2015

(54) DESANDING APPARATUS AND SYSTEM

(75) Inventor: Christopher A. Hemstock, Calgary (CA)

(73) Assignee: Specialized Desanders Inc., Calgary (CA)

( * ) Notice: Subject to any disclaimer, the term of this patent is extended or adjusted under 35 U.S.C. 154(b) by 367 days.

(21) Appl. No.: 13/372,291

(22) Filed: Feb. 13, 2012

(65) Prior Publication Data

US 2013/0206007 A1 Aug. 15, 2013

(51) Int. Cl.
*B01D 50/00* (2006.01)

(52) U.S. Cl.
USPC ............. 55/319; 210/519; 210/539; 210/540; 210/541; 210/532.1; 210/537; 95/253; 96/182; 96/183; 96/184

(58) Field of Classification Search
USPC ......... 55/319; 210/519, 539, 540, 541, 532.1, 210/537; 95/253; 96/182, 183, 184
See application file for complete search history.

(56) References Cited

U.S. PATENT DOCUMENTS

| | | | |
|---|---|---|---|
| 4,073,734 A * | 2/1978 | Lowrie | 96/184 |
| 7,429,332 B2 | 9/2008 | Surjaatmadja et al. | |
| 8,308,959 B2 | 11/2012 | Noles, Jr. | |
| 2004/0074838 A1 * | 4/2004 | Hemstock et al. | 210/513 |

FOREIGN PATENT DOCUMENTS

| | | |
|---|---|---|
| CA | 2041479 | 10/1992 |
| CA | 2433741 | 10/2003 |
| GB | 773096 | 4/1957 |
| WO | 02070101 | 9/2002 |

OTHER PUBLICATIONS

PCT/CA2012/050915—International Search Report, 2012.

* cited by examiner

*Primary Examiner* — Dung H Bui
(74) *Attorney, Agent, or Firm* — Sean W Goodwin

(57) ABSTRACT

A desanding system has an elongated vessel that is tilted at a non-zero inclination angle. A fluid inlet at the vessel's upper end discharges a gas stream having entrained liquids and particulates and a fluid outlet into a freeboard portion formed adjacent an upper portion of the vessel above a gas/liquid interface formed below the fluid outlet. A belly storage portion is formed below the interface. The freeboard portion of the vessel has a freeboard cross-sectional area that diminishes along the interface from the fluid inlet to a fluid outlet spaced away from and lower than the fluid inlet. The cross-sectional are of the freeboard portion causes precipitation of the entrained liquids and particulates therefrom and collect in the belly portion of the vessel. A desanded gas stream, being free of a substantial portion of the particulates is removed from the vessel through the fluid outlet.

16 Claims, 5 Drawing Sheets

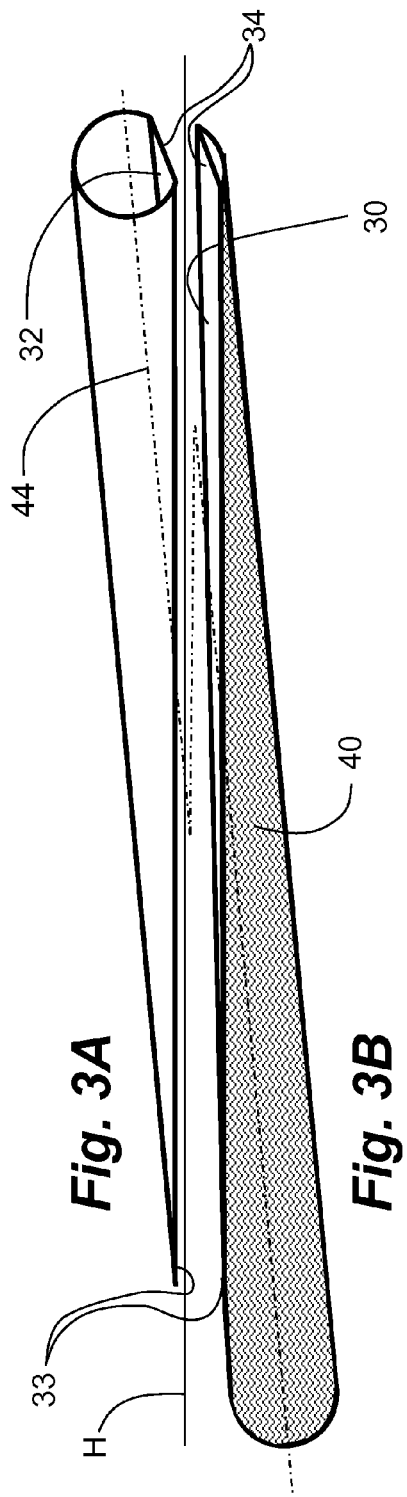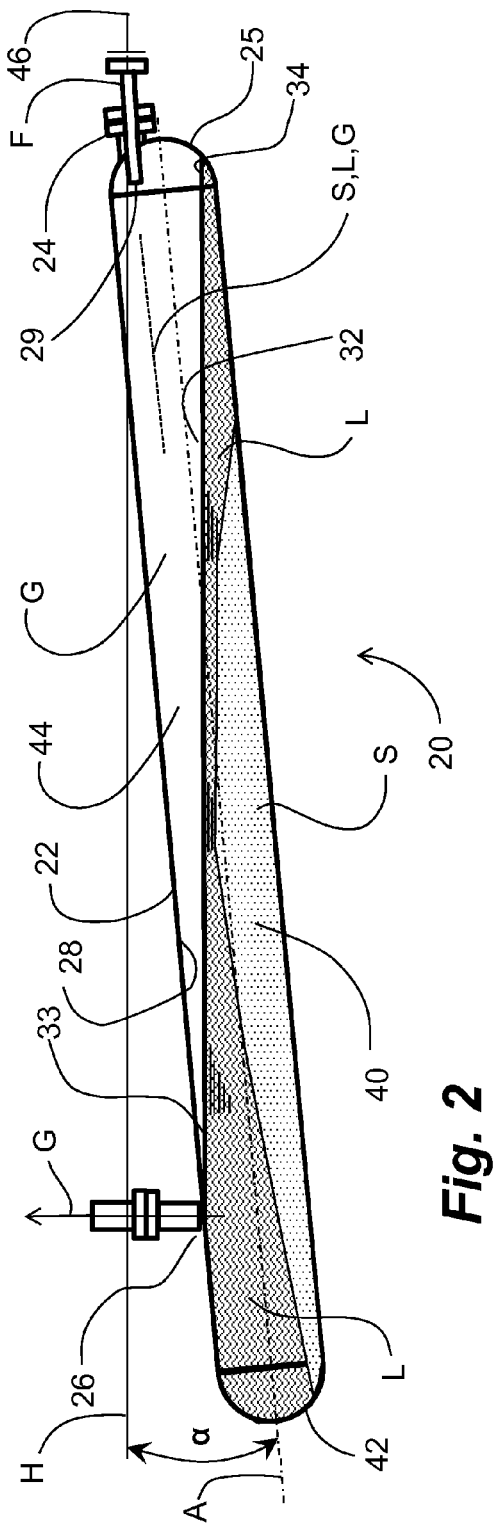

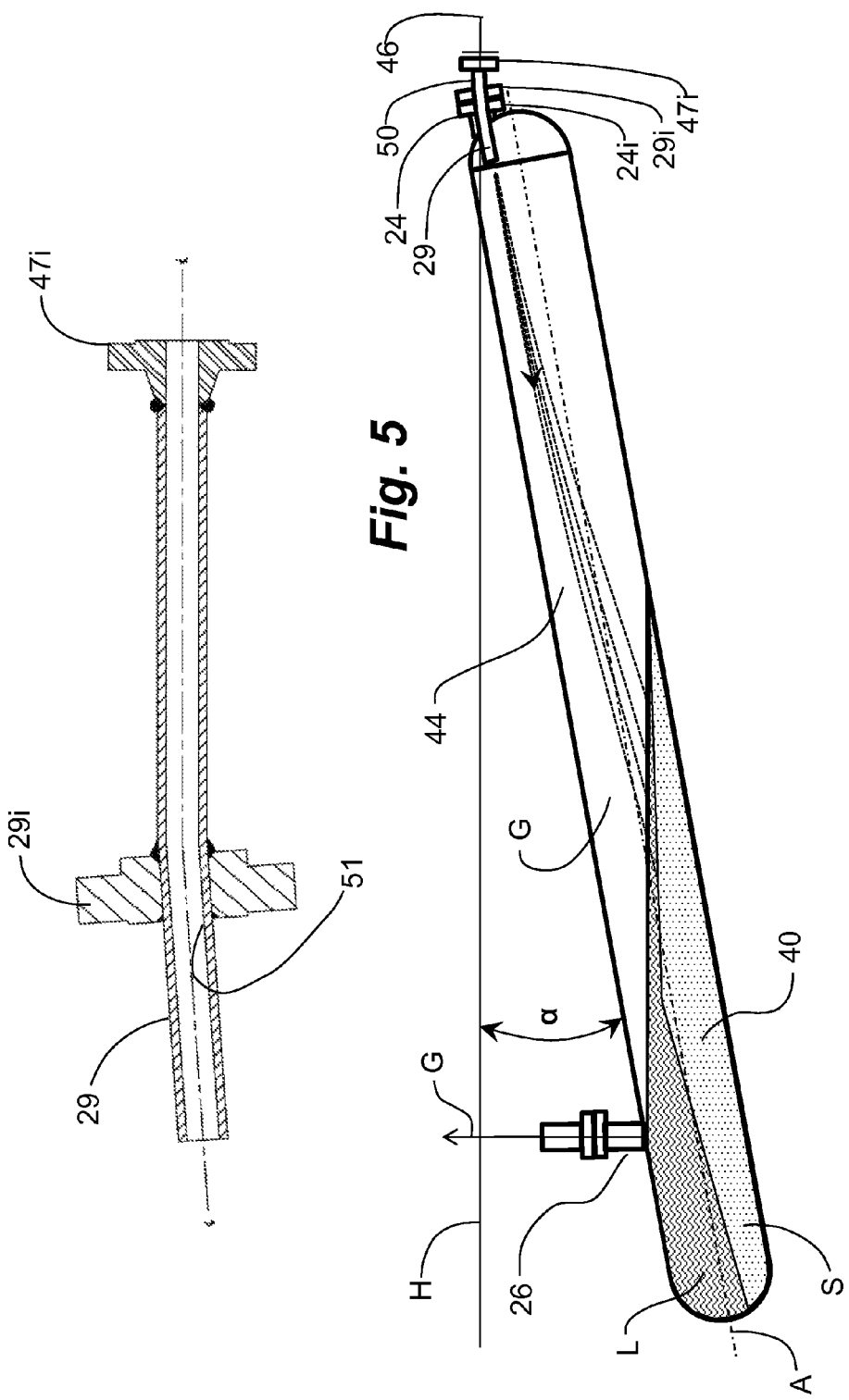

DESANDING APPARATUS AND SYSTEM

FIELD OF THE INVENTION

The present invention relates to a system and apparatus for the removal of particulates, such as sand, from fluid streams produced from a well, while minimizing abrasion of the involved equipment.

BACKGROUND OF THE INVENTION

Production from wells, in the oil and gas industry, often contains particulates such as sand. These particulates could be part of the formation from which the hydrocarbon is being produced, introduced particulates from hydraulic fracturing or fluid, loss material from drilling mud or fracturing fluids, or from a phase change of produced hydrocarbons caused by changing conditions at the wellbore (Asphalt or wax formation). As the particulates are produced, problems occur due to abrasion, and plugging of production equipment. In a typical startup, after stimulating a well by fracturing, the stimulated well may produce sand until the well has stabilized, often up to several months after production commences. Other wells may require extended use of a desander.

Erosion of the production equipment is severe enough to cause catastrophic failure. High fluid stream velocities are typical and are even purposefully designed for elutriating particles up the well and to the surface. An erosive failure of this nature can become a serious safety and environmental issue for the well operator. A failure, such as a breach of high pressure piping or equipment, releases uncontrolled high velocity flow of fluid which is hazardous to service personnel. Releasing such fluid to the environment is damaging to the environment resulting in expensive cleanup and loss of production. Repair costs are also high.

In all cases, retention of particulates contaminates surface equipment and the produced fluids, and impairs the normal operation of the oil and gas gathering systems and process facilities.

In one prior art system, a pressurized tank ("P-Tank") is placed on the wellsite and the well is allowed to produce fluid and particulates. The fluid stream is produced from a wellhead and into a P-Tank until sand production ceases. The large size of the P-Tank usually restricts the maximum operating pressure of the vessel to something in the order of 1,000-2,100 kPa. In the case of a gas well, this requires some pressure control to be placed on the well to protect the P-Tank. Further, for a gas well, a pressure reduction usually is associated with an increase in gas velocity which in turn makes sand-laden wellhead effluent much more abrasive. Another problem associated with this type of desanding technique is that it is only a temporary solution. If the well continues to make sand, the solution becomes prohibitively expensive. In most situations with this kind of temporary solution, the gas vapors are not conserved and sold as a commercial product.

An alternate, known prior art system includes employing filters to remove particulates. A common design is to have a number of fiber-mesh filter bags placed inside a pressure vessel. The density of the filter bag fiber-mesh is matched to the anticipated size of the particulates. However, filter bags are generally not effective in the removal of particulates in a multiphase condition. Usually, multiphase flow in the oil and gas operations is unstable. Large slugs of fluid followed by a gas mist are common. In these cases, the fiber bags become a cause for a pressure drop and often fail due to the liquid flow therethrough. Due to the high chance of failure, filter bags may not be trusted to remove particulates in critical applications or where the flow parameters of a well are unknown. An additional problem with filter bags in most jurisdictions, is the cost associated with disposal. The fiber-mesh filter bags are considered to be contaminated with hydrocarbons and must be disposed of in accordance to local environmental regulation.

In Canadian Patent Number 2,433,741, issued Feb. 3, 2004 and in Canadian Patent Number 2,407,554, issued Jun. 20, 2006, both assigned to the Applicant, a desander is disclosed having an elongate, horizontal vessel having an inlet at one end and an outlet at the other end, the outlet separated from the inlet by a downcomer flow barrier, such as a weir, adjacent the vessel's outlet or exit. The weir forms, and maintains, an upper freeboard portion having a cross-sectional area which is greater that of the field piping from whence the fluid stream emanates for encouraging water and particulates to fall out of the freeboard portion. Water and particulates accumulate along a belly portion. The accumulation of particulates is along a substantial length of the elongate vessel increasing the difficulty of periodic manual removal of such accumulating using scraper rods and the like.

While Applicant has substantially maintained their elongated horizontal design virtually unchanged over the past 8 years or so, there has been a desire to improve the ease with which the vessel can be cleaned and further improvement in separation efficiency. Further, due to the nature of the gases handled, including pressure and toxicity, all vessels and pressure piping must be manufactured and approved by appropriate boiler and pressure vessel safety authorities.

SUMMARY OF THE INVENTION

Desanding apparatus is provided which is placed adjacent to a well's wellhead for intercepting a fluid stream flow before prior to entry to equipment including piping, separators, valves, chokes and downstream equipment. The fluid stream can contain a variety of phases including liquid, gas and solids. In one embodiment, a pressure vessel is inserted in the flowstream by insertion into high velocity field piping extending from the wellhead. The vessel contains an upper freeboard portion having a cross-sectional area which is greater that of the field piping from whence the fluid stream emanates. As a result, fluid stream velocity drops and particulates cannot be maintained in suspension. The freeboard portion is maintained through control of the angle of the desander, obviating the need for a downcomer of Applicant's own prior art horizontal desanders.

In a broad aspect, a desanding system receives a gas stream containing entrained liquid and particulates. The system comprises a vessel, elongated along a longitudinal axis and inclined from a horizontal at a non-zero inclination angle. The vessel has a fluid inlet, adjacent an upper end for discharging the gas stream into the vessel at an inlet velocity, and a fluid outlet, spaced along the longitudinal axis from, and lower than, the fluid inlet.

The vessel further has a gas/liquid interface at the fluid outlet, a belly storage portion formed below the interface, and a freeboard portion formed adjacent an upper portion of the vessel above the interface. The freeboard portion has a freeboard cross-sectional area which diminishes from the fluid inlet to the fluid outlet, wherein a freeboard velocity, adjacent the fluid inlet is less than the inlet velocity, the freeboard velocity being such that the entrained liquids and particulates fall out of the gas stream for collecting in the belly storage portion. A desanded gas stream flows out of the freeboard portion and out the fluid outlet, being free of a substantial portion of the particulates.

More preferably, a vessel of an embodiment of the present invention is incorporated in a desanding system to replace existing prior connective piping for a wellhead, the vessel being supported using structure to align the vessel with the wellhead piping and downstream equipment. The desander's fluid inlet and fluid outlet, associated with the inclined world of the desander, are adapted to connect to the orthogonal world of the connective piping.

In another broad aspect, a method for desanding a fluid stream, emanating from a wellhead and containing gas and entrained liquid and particulates, comprises providing an elongated vessel having a longitudinal axis which is inclined from the horizontal. The vessel has a fluid inlet adjacent an first end of the vessel and a fluid outlet spaced along the longitudinal axis from the fluid inlet; inclining the vessel at angle from a horizontal at a non-zero inclination angle so that the fluid outlet is lower that the fluid inlet for forming a freeboard portion above the fluid outlet. The fluid stream is discharging from the fluid inlet, into the vessel and substantially parallel to the longitudinal axis for establishing a liquid interface in a belly portion of the vessel, the belly portion and being formed below the fluid outlet. Liquid and particulates are being directed along a trajectory in the freeboard portion of the vessel to intercept a substantial portion of the particulates at the liquid interface for storage in the belly portion. A desanded gas stream is recovered at the fluid outlet which is substantially free of particulates.

The inlet can be parallel or non-parallel with the longitudinal axis for enabling a trajectory to intercept the gas/liquid interface. The fluid stream can be introduced through a replaceable nozzle. The fluid inlet can be curved to align the inlet from the inclined desander and orthogonal piping from a wellhead.

BRIEF DESCRIPTION OF THE DRAWINGS

FIG. 2 is a cross-sectional view of an embodiment of a tilted or inclined desander;

FIGS. 3A and 3B are perspective representations of the volumes of the belly portion and freeboard portions of the inclined desander of FIG. 2;

FIG. 4 is a cross-sectional view of another embodiment of an inclined desander having a greater inclination angle than that of FIG. 2;

FIG. 5 is a cross sectional view of a curved fluid inlet, square to the desander, and having a long radius angular transition elbow between orthogonal piping and the inclined desander;

DETAILED DESCRIPTION OF THE PREFERRED EMBODIMENT

A desander is typically inserted between or as a replacement for existing piping such as connecting piping between a wellhead and downstream equipment such as multiphase separators.

Figure 1:
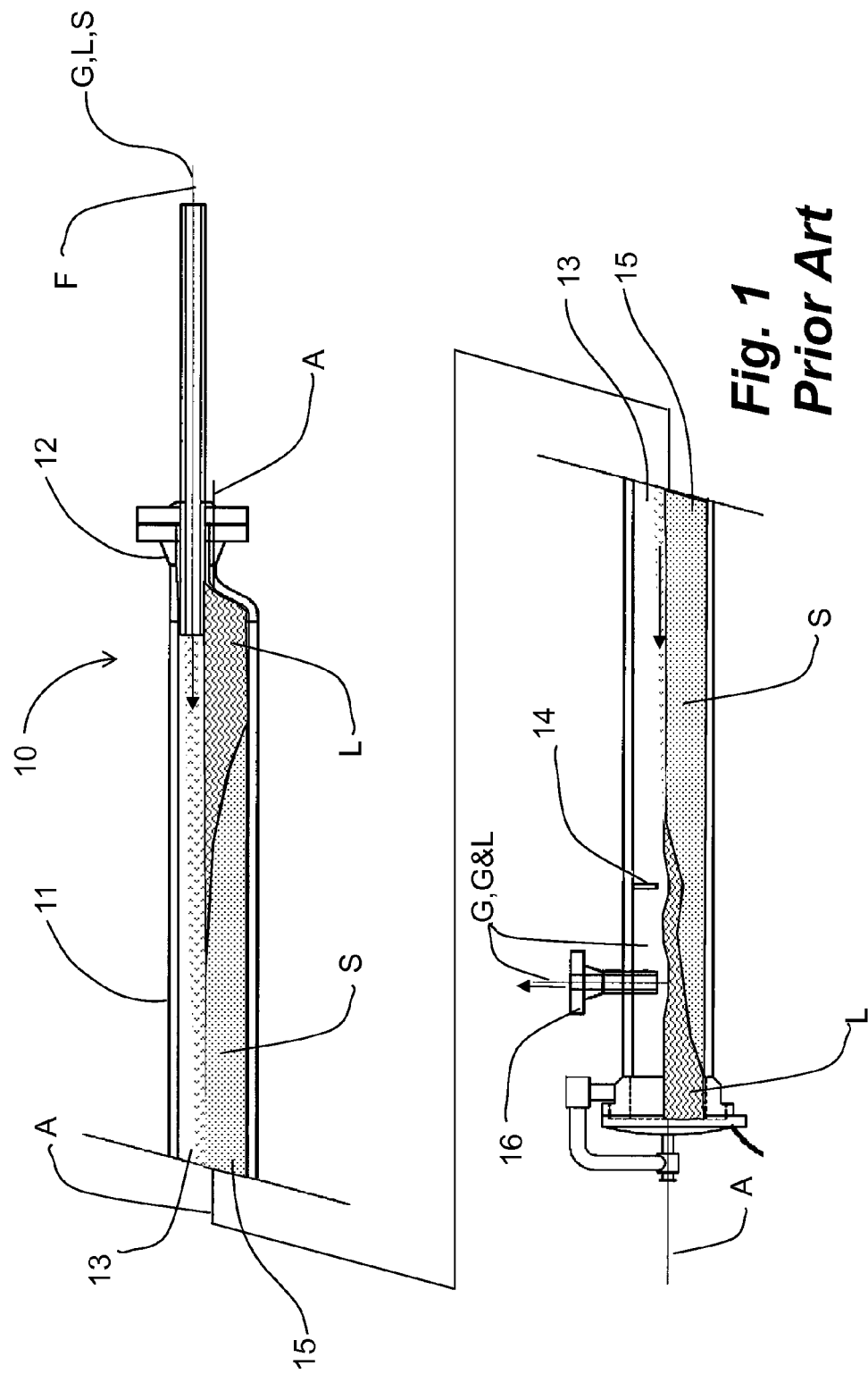
FIG. 1 is a cross-sectional side view of Applicant's prior art elongated horizontal desander illustrating downcomer flow barrier, fluid streams, falling trajectory of particulates, and accumulations of separated liquid, particulates and particulate-free fluid discharge.

As shown in FIG. 1, a prior art horizontal desander comprises a cylindrical pressure vessel 11 having a substantially horizontal axis A, a first fluid inlet end 12 adapted for connection to the fluid stream F. The fluid stream F typically comprises a variety of phases including gas G, some liquid L and entrained particulates such as sand S. The fluid stream F containing sand S enters through the inlet end 12 and is received by a freeboard portion 13. In the illustrated prior art vessel, the freeboard area is set by a downcomer flow barrier 14. Accordingly, the velocity of the fluid stream F slows to a point below the entrainment or elutriation velocity of at least a portion of the particulates S in the fluid stream. Given sufficient horizontal distance without interference, the particulates S eventually fall from the freeboard portion 13. Particulates S and liquids L accumulate over time in the belly portion 15 and are periodically cleaned out at sufficient intervals to ensure that the maximum accumulated depth does not encroach on the freeboard portion 13. The desanded fluid stream, typically liquid L and gas G, emanates from fluid outlet 16.

As shown in FIGS. 2 through 7, embodiments of an inclined desander 20 are free of the prior art flow barrier and, through tilting or inclination of the vessel, maximize freeboard upon entry of the flow stream, and reduce liquid flow rates for maximizing settling conditions therein and retention of captured particulates S. Variability of the inclination angle $\alpha$ enables a measure of variability between the respective freeboard and liquid-storing belly portion for adjusting performance.

As shown in FIG. 2, the desander 20 comprises a vessel 22 having an axis A oriented at an angle $\alpha$ to the horizontal H. The desander 20 has a fluid inlet 24 at an upper end 25 for receiving a fluid stream F typically comprising a variety of phases including gas G, some liquid L and entrained particulates such as sand S. In this embodiment, the fluid inlet 24 is oriented parallel to a longitudinal axis A of the vessel 22. A fluid outlet 26 is located along a top 28 of the vessel 22, and spaced from the fluid inlet 24. In an operating state, a gas/liquid interface 32 forms extending horizontally from about the fluid outlet 26. A belly portion 40 is formed below the interface 32 for containing liquid L and particulates S. A freeboard portion 44 is formed above the interface 32. The fluid inlet 24 discharges into the freeboard 44. Particulate trajectory can be manipulated by positioning and orienting a discharge end 29 of the fluid inlet 24. In one embodiment, the discharge 29 of the inlet 24 can be aligned parallel to the vessel axis A. The inlet 24 or discharge 29 can be oriented in other orientations including above the inclined axis A, or below the axis A.

The interface 32 is a generally obround, gas/liquid interface between the belly and freeboard portions 40,44. The obround interface 32 has a distal end 33 adjacent the fluid outlet 26 and a proximal end 34, the location of which is intermediate the fluid outlet 26 and fluid inlet 24 and varies with liquid level and inclination angle $\alpha$. As a result of the desander 20 inclination, the trajectory of the fluid stream F, from inlet 24, converges with the interface 32. The trajectory for dropping sand S and liquid L into the belly portion 40 is foreshortened, reducing drop out time. The vessel 22 is long enough to space the fluid inlet 24 sufficiently from the interface 32 to minimize turbulence of the liquid L in the belly portion 40, that spacing being dependent upon various design factors including vessel inclination angle $\alpha$, inlet fluid stream velocity and characteristics.

At a steady state, the maximum level of the interface 32, is controlled at the distal end 33, set by eventual liquid entrainment and discharge at the fluid outlet 26. Gas G discharges at the fluid outlet 26. At steady state, when the liquid level reaches the fluid outlet 26, any oil and other liquids are re-entrained with the gas G exiting at fluid outlet 26. Particulates S continue to be captured in the belly portion 40 until its volumetric capacity is reached.

Connective piping 46, between conventional wellhead and downstream equipment, is typically in rectilinear or orthogonal arrangements. Thus, the angle α of the desander 20 introduces coupling or connection challenges. The connective piping 46 is generally horizontal or vertical and incorporation of the inclined desander 20 requires an adjustment made at the fluid inlet 24 and fluid outlet 26. In many scenarios, with a small inclination angle α, the fluid outlet 26 can be fit to the top 28 of the vessel 22 at angle α, orienting the outlet 26 vertically and thereby obviating the need for an angular transition.

Turning to FIGS. 3A and 3B, the desander 20 is shown diagrammatically split at the interface 32 for illustrating the incrementally increasing volume of the belly portion 40 below and the incrementally decreasing volume of freeboard portion 44, increasing and decreasing as referenced to the feed stream F. The freeboard portion 44 demonstrates a cross-sectional area which diminishes from the fluid inlet 24 to the fluid outlet 26. As shown in FIGS. 2 and 4, a freeboard velocity at the fluid inlet 24 is such that the entrained liquids L and particulates S fall out of the fluid stream F and collect in the storage belly portion 40. The cross-sectional area of the freeboard portion 44, adjacent the fluid inlet 24, is at its greatest for achieving the lowest average inlet velocity for maximum drop out efficiency for particulates S and liquids L. As the freeboard cross-sectional area adjacent the fluid inlet 24 is large and relatively unimpeded by the belly portion 40, the velocity reduction upon discharge is significantly greater than that of Applicant's prior art horizontal desander. Particulate removal is accomplished while minimizing the portion of the vessel allocated to the freeboard portion 44, maximizing the efficiency of that freeboard portion for particulate drop out, and resulting in a greater allocation of the overall portion of the vessel to the belly portion 40 for storage.

Velocity in the freeboard portion 44 increases after a substantial portion of the particulates S have already deposited in the belly portion 40. The cross-sectional area of the belly portion 40 increases towards the fluid outlet 26 and the velocity of liquids accumulating therein diminishes.

With reference again to FIG. 2 and to FIG. 4, in the belly portion, particulates accumulate and flow downvessel at an angle of repose. The accumulation of liquid L and particulates S establishes a downward flow in the belly portion, and as the particulates accumulate and limit the free flow of the liquid L in the belly portion 40, the liquid velocity begins to increase, drawing more particulates S downvessel.

With reference to FIG. 4, the inclination angle α can be adjusted, shown here as an increased angle over that of FIG. 2. At increasing angles α the trajectory of the feed stream impinges the interface 32 at less acute angle, impinges the interface 32 sooner and enables selection of shorter vessels 22 and greater particulate removal efficiency.

Inclination angles α can be adjusted, for a given length of vessel 22, between fluid inlet 24 and fluid outlet 26, to accommodate gas G and liquid L content in the feed fluid stream F. Inclination angles α would generally be in the range of about 2 degrees to about 20 degrees. The shallowest operating angle α is limited by the minimum requirement for a minimum freeboard 44 cross-sectional area adjacent the inlet 24 once the interface 32 builds to about the fluid outlet 26. The steepest operating angle α is limited by the requirement for a minimum storage capacity in the belly portion 40. The minimum inclination angle would be the condition where the inlet 24 is entirely in the gas phase of the freeboard portion 44 and the gas phase at the discharge is of zero height. The maximum inclination angle would be the condition where the inlet 24 is well above the gas/liquid interface allowing substantial freeboard to handle slug flow. Angles above 45 degrees limit the performance of desander considerably since the residence time of the liquid phase in the belly portion 40 is reduced.

With reference to FIGS. 4 and 5, the fluid inlet 24, exposed to entrained particulates S in the fluid stream, is subject to greatest risk of erosion. While the inlet 24 can be integrated with the vessel 22, one can also provide an inlet 24 or discharge 29 that is replaceable for ease of maintenance. Options include accepting eventual wear and shutdown of the desander 20 for replacement of an integrated inlet 24; modifying the material or configuration of the inlet 24 to prolong service life, or using replaceable discharge of nozzle for minimizing turnaround time. As stated, one approach is to make the discharge 29 replaceable including incorporating features of a replaceable nozzle as set forth in Applicant's Canadian Patent Number 2,535,215 issued May 8, 2008. A replaceable nozzle 50 can be fit to a compatible coupling at the upper end 25 of the vessel 22. One form of replaceable nozzle 50 comprises the discharge 29, and a threaded connection or nozzle flange 29i, for connection to a compatible threaded connection or flange 24i at the inlet 24 of the vessel 22. The orientation of the discharge is dependent on the coupling 24i,29i and arrangement of the discharge relative thereto. The replaceable nozzle 50 includes a connecting piping coupling, such as a connective flange 47i for connecting to the piping 47.

To maximize service life, the nozzle 50 can incorporate a curved portion 51, such as a long radius elbow, transition between the orthogonal world of the connecting piping and the inclined axis A of the vessel 22. That curved portion 51 can be integrated with the inlet 24, nozzle 50 or located in advance thereof, such as in a transition pup joint.

In operation, various sizes are desanders are employed in the prior art for differing operational conditions. Prior art desanders 10, such as that described in U.S. Pat. No. 6,983,852 to Applicant, for different feed fluid streams F, might include one typical standard vessel 11 having a nominal 0.3 m (12 inch) diameter by 3.048 m (10 feet) long and another vessel 11 having 0.3 m (12 inch) diameter by 6.096 m (20 feet) long, both of which are fitted with a downcomer weir to set the freeboard portion.

Herein, in the inclined desander 20, the prior art downcomer flow barrier, such as a weir, can be eliminated by providing similar 0.3 m (12 inch) diameter vessels 22 and tilting the upper end 30 of the new desander 20 at about twice the prior art weir height so as to form the interface 32 at the fluid outlet 26. To mimic the minimum operating performance of the 3.048 m (10 feet) and 6.096 m (20 feet) prior art desanders, a 20 foot long inclined vessel 22 would only need to be inclined about ½ the angle α of the 10 foot long inclined vessel 22. Performance can be adjusted by varying the angle.

Figure 6:
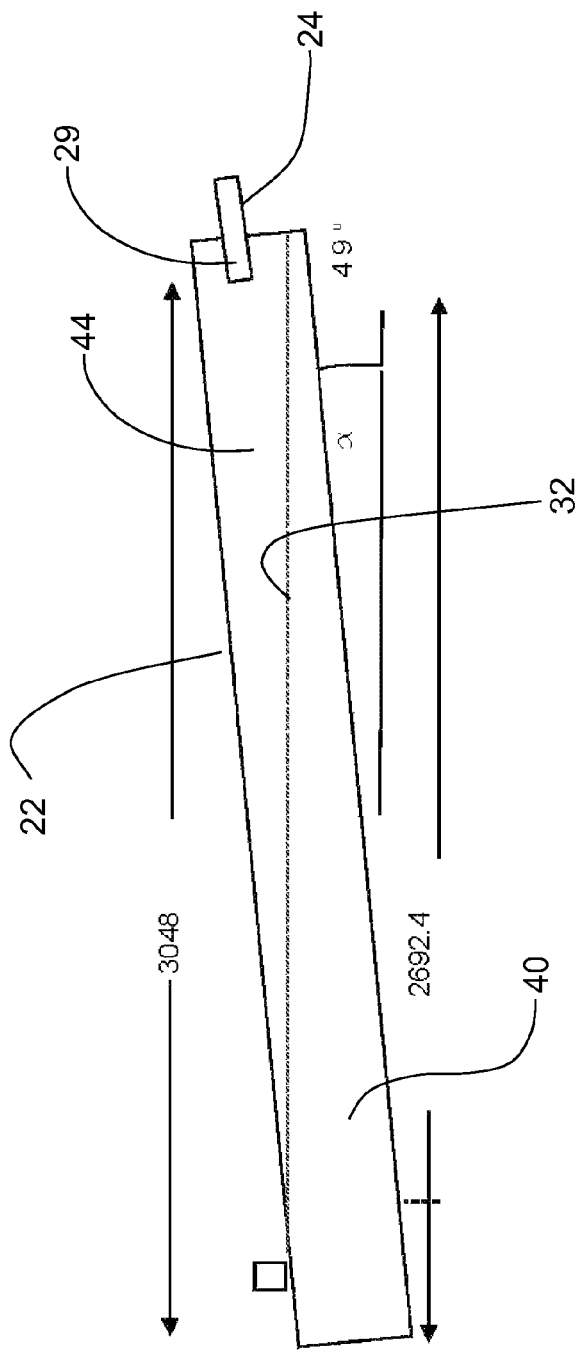
FIG. 6 is a representation of an inclined desander illustrating parameters for an example 12 inch diameter desander handling 50 $m^3/d$ of fluid flow.

As shown in FIG. 6, an example of an inclined desander 20 can receive a fluid stream F of 50 m$^3$/d, bearing particulates S having an average size of 150 um. The fluid stream F can be discharged to vessel 22, having a 0.3 m (1 foot) diameter and 3.048 m (10 feet) long. A typical pressure of the fluid stream F is about 7000 kPa (1015 psia). At an inclination angle α of 4.9 degrees, the freeboard volume is 0.10 m$^3$ and the belly portion is 0.486 m$^3$. The resulting belly portion capacity is about 502 kg of sand particulates.

Figure 7:
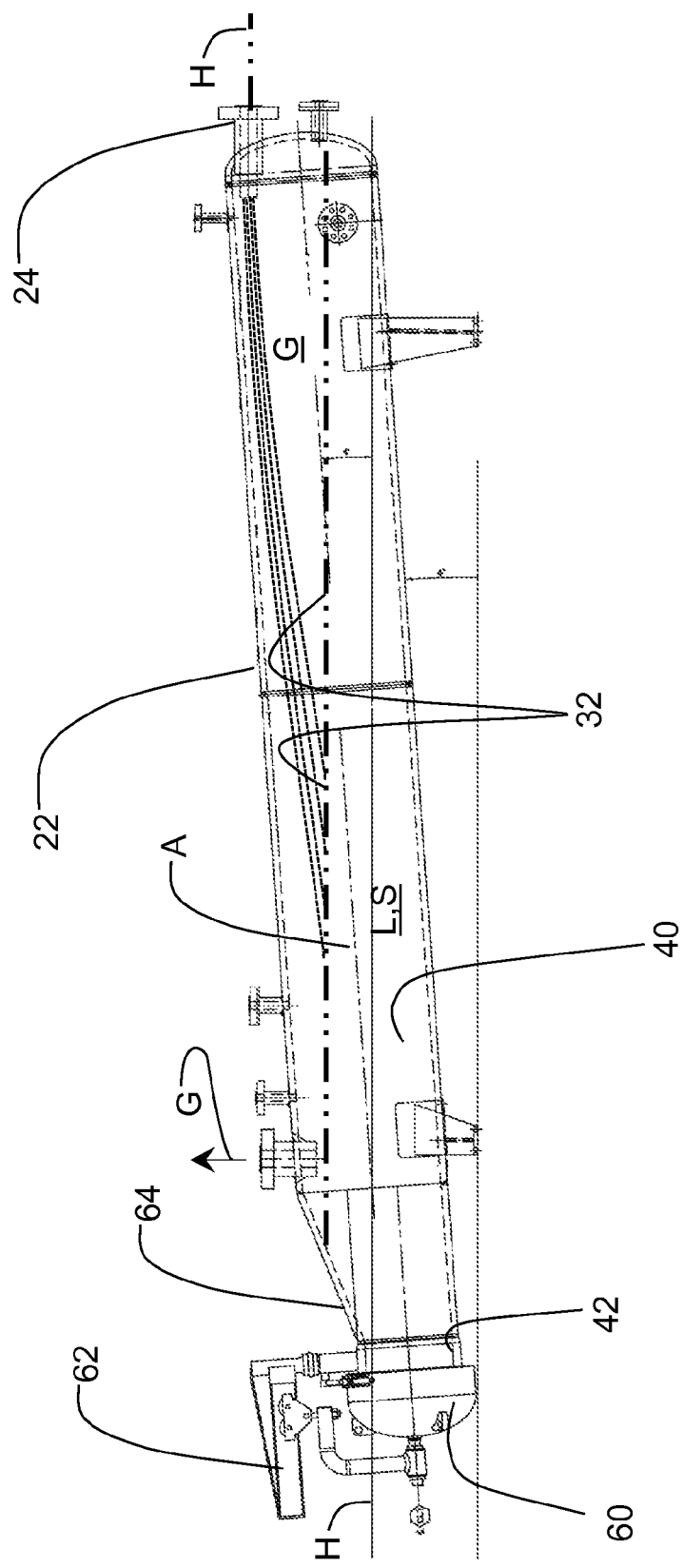
FIG. 7 is a representation of an inclined desander illustrating parameters for an example 36 inch diameter desander having a horizontal fluid inlet.

As shown in FIG. 7, another embodiment of an inclined desander 20 illustrates some additional optional characteristics including a fluid inlet 24 oriented horizontally, the inlet being directly connectable to orthogonal connection piping. The discharge 29 is oriented at an angle to the longitudinal axis A, in this case in a generally horizontal plane, which is angled upwardly from axis A. The initially horizontal trajectory of a substantial portion of the feed stream falls off before engaging the vessel 22. In part, the inlet 24 can be square to the connective pipe as, in this embodiment, the vessel 22 is of sufficient diameter, such as 36 inches, to permit inlet placement in the freeboard 44 while the trajectory is such that it minimizes or avoids vessel wall involvement. As shown, a horizontal spacing between the inlet 24 and inside wall of the vessel 22 is about 1.5 feet.

Removal of accumulated particulates is conducted periodically with the vessel 22 shut in, adjacent the inlet 24 and outlet 26, and depressurized. Conveniently, access can be through a pressure-rated access closure and port at the lower end 42, as the angle of repose and flow in the belly portion carries particulates thereto. A suitable closure is shown in FIG. 1 of the prior art and in FIG. 7 as adapted to the inclined desander 20. The vessel 22 is supported sufficiently high of the ground or otherwise positioned for angular access thereto, such as with scrapers and the like. A pressure vessel, hemispherical head-form of closure 60 can be pivoted from the vessel 22 and counterweighted to close flush to the inclined cylindrical end of the vessel 22. A gantry 62 assists in manipulation of the head for access to the belly portion 40.

Further, the illustrated vessel 22 includes an eccentric end 64 at the lower end 42, to reduce the diameter of the vessel 22 downstream of the fluid outlet 26. Advantages of reducing the vessel diameter at the lower end 42 include adapting to a smaller, more easily manageable or standard form of clean out. As shown the cleanout is a pressure-rated closure 60 supported upon gantry 62. In this embodiment, a 36 inch vessel, having 33 inch internal diameter, is inclined at 4 degrees. The cylindrical portion of the vessel is about 20 feet long with a 3 foot long eccentric portion, reducing the diameter from 3 to about 18 inches for fitting an 18 inch clean out.

Conventional pressure safety valves and other gas phase related devices and instrumentation, not shown, are reliably located in the freeboard portion 44 between the fluid outlet 26 and the upper end 25.

The embodiments of the invention for which an exclusive property or privilege is claimed are defined as follows:

1. A desanding system for receiving a gas stream containing entrained liquid and particulates comprising:
a vessel elongated along a longitudinal axis and having a fluid inlet adjacent a first end of the vessel and a fluid outlet spaced along the longitudinal axis from the fluid inlet towards a second end of the vessel, said vessel being inclined from a horizontal at a non-zero inclination angle at all times during operation such that the fluid outlet is lower than the fluid inlet, the fluid inlet discharging the gas stream into the vessel at an inlet velocity, the gas stream travelling down the inclined vessel to the fluid outlet the vessel having:
a gas/liquid interface formed at the fluid outlet having a belly storage portion formed therebelow and a freeboard portion formed adjacent an upper portion of the vessel above the interface, the freeboard portion having a freeboard cross-sectional area which diminishes along the inclined vessel from the fluid inlet to the fluid outlet; and
the freeboard portion at the fluid inlet causing the gas stream to have a freeboard velocity adjacent the fluid inlet which is less than the velocity of the fluid in the inlet, wherein
the freeboard velocity is such that the entrained liquids and particulates fall out of the gas stream and collect in the belly storage portion, and
wherein a desanded gas/liquid stream flows out of the freeboard portion and out the fluid outlet, being free of a substantial portion of the particulates, and particulates accumulate in the belly portion for flowing downvessel towards said second end.

2. The desanding system of claim 1 wherein fluid inlet has a discharge end, the discharge end oriented for discharging the gas stream into the freeboard portion.

3. The desanding system of claim 1 wherein discharge end of the fluid inlet directs the gas stream into the freeboard portion and parallel to the longitudinal axis.

4. The desanding system of claim 1 wherein the fluid inlet further comprises a replaceable nozzle having a discharge end oriented for discharging the gas stream into the freeboard portion.

5. The desanding system of claim 4 wherein the replaceable nozzle is connected to the fluid inlet at a flange.

6. The desanding system of claim 1 wherein the gas stream emanates from a wellhead and the fluid inlet further comprises:
a discharge end for directing the gas stream into the freeboard portion and parallel to the longitudinal axis;
a receiving end for receiving the gas stream and orthogonal to the wellhead.

7. The desanding system of claim 1 further comprising:
a conduit for conducting a fluid stream containing entrained particulates from a wellhead, the conduit having a desander end; and
wherein the fluid inlet further comprises a discharge end for directing the fluid stream into the freeboard portion and oriented parallel to the longitudinal axis, and a receiving end for receiving the gas stream and oriented orthogonal to the desander end.

8. The desanding system of claim 1 wherein the inclination angle is variable for varying fluid stream conditions.

9. A method for desanding a fluid stream emanating from a wellhead, the fluid stream containing gas, entrained liquid and particulates, the method comprising:
providing an elongated vessel having a longitudinal axis, a fluid inlet adjacent a first end of the vessel and a fluid outlet spaced along the longitudinal axis from the fluid inlet;
inclining the vessel at angle from horizontal at a non-zero inclination angle so that the fluid outlet is lower than the fluid inlet for forming a freeboard above the fluid outlet;
discharging the fluid stream from the fluid inlet, into the inclined vessel and substantially parallel to the longitudinal axis for
establishing a liquid interface in a belly portion of the vessel, the belly portion being formed below the fluid outlet, and
directing the liquid and particulates along a trajectory in the freeboard portion of the vessel to intercept a substantial portion of the particulates at the liquid interface for storage in the belly portion; and
recovering a desanded gas stream at the fluid outlet which is substantially free of particulates.

10. The desanding system of claim 1 wherein said gas/liquid interface is formed during operation, the gas/liquid interface extending horizontally from about the fluid outlet.

11. The desanding system of claim 1 wherein said the cross-section area of the freeboard portion is at its greatest adjacent the fluid inlet.

12. The desanding system of claim 1 wherein said inclination angle is between about 2 degrees and about 20 degrees.

13. The desanding system of claim 1 further comprising: an access closure at said second end for removal of accumulated particulates.

14. The desanding system of claim 1 wherein said vessel has a smaller diameter downstream of the fluid outlet than the diameter of other portion of the vessel.

15. The desanding system of claim 14 wherein second end of the vessel is an eccentric end.

16. The method of claim 9 further comprising:
accumulating particulates in said belly portion; and
periodically removing accumulated particulates.

\* \* \* \* \*